United States Patent [19]

Ashton et al.

[11] Patent Number: 5,467,889
[45] Date of Patent: Nov. 21, 1995

[54] NESTABLE ELASTIC FUEL TANK AND METHOD FOR MAKING SAME

[75] Inventors: Larry J. Ashton, Mapleton; Michael G. Allman, Spanish Fork; Benko Ta-Ala, Provo, all of Utah

[73] Assignee: AeroTrans, Salt Lake City, Utah

[21] Appl. No.: 273,658

[22] Filed: Jul. 12, 1994

[51] Int. Cl.⁶ ............................................. B65D 88/24
[52] U.S. Cl. .................. 220/562; 220/403; 220/461; 220/905; 244/135 B; 428/36.2; 428/36.3; 428/231
[58] Field of Search ................. 220/562, 590, 220/589, 588, 586, 592, 403, 461, 460, 454, 455, 457, 666, 905; 428/36.1, 36.2, 36.3, 231, 265, 267; 244/135 B

[56] References Cited

U.S. PATENT DOCUMENTS

| | | | |
|---|---|---|---|
| 2,552,119 | 5/1951 | Scharenberg | 220/905 |
| 2,973,293 | 2/1961 | Schofield | 220/905 |
| 3,101,921 | 8/1963 | Price | 244/135 B |
| 3,664,904 | 5/1972 | Cook | 220/905 |
| 3,966,147 | 6/1976 | Wittko et al. | 220/905 |
| 3,978,901 | 9/1976 | Jones | 220/905 |
| 4,214,721 | 7/1980 | Burhans, Jr. et al. | 244/135 B |
| 4,715,417 | 12/1987 | Coloney | 150/55 |
| 4,790,350 | 12/1988 | Arnold | 137/588 |
| 4,948,070 | 8/1990 | Lyman | 244/135 R |
| 5,054,635 | 10/1991 | Kolom | 220/4.15 |
| 5,180,190 | 1/1993 | Kersey et al. | 428/36.4 |
| 5,242,743 | 9/1993 | Nakanishi et al. | 428/36.2 |

FOREIGN PATENT DOCUMENTS 1324993 7/1973 United Kingdom ................... 220/905

Primary Examiner—Stephen J. Castellano
Attorney, Agent, or Firm—Madson & Metcalf

[57] ABSTRACT

A fuel tank for aircraft includes a rigid securement for securing the tank to the aircraft, a skin connected to the securement, and a liner inside the skin. The skin includes an elastic fiber and a tensile fiber embedded in a flexible matrix. In one embodiment, the elastic fiber and the tensile fiber are wound in layers within the flexible matrix, and the elastic fiber is wrapped spirally about the tensile fiber. The elastic fiber is preferably an elastomeric fiber such as an elastic, segmented polyurethane fiber. The tensile fiber is preferably an aramid polymer fiber such as an aromatic polycarbonamide fiber. The flexible matrix may be formed of natural rubber or neoprene rubber. When the tank is filled, the elastic fiber lengthens until the tensile fiber resists further stretching. The elastic fiber tends to contract as the tank is emptied, substantially reducing the storage space required by the tank. The tank is nestable when empty, but is nonetheless substantially ready to receive fuel. A method for forming the fuel tank includes obtaining a mandrel, covering the mandrel with a liner, and fiber winding an elastic fiber and a tensile fiber in a flexible matrix about the mandrel.

21 Claims, 5 Drawing Sheets

NESTABLE ELASTIC FUEL TANK AND METHOD FOR MAKING SAME

FIELD OF THE INVENTION

The present invention relates to an external fuel tank for aircraft. More particularly, the present invention relates to a fuel tank which, by virtue of a skin comprising an elastic fiber and a tensile fiber embedded in a flexible matrix, is both nestable and ready to receive fuel when empty.

TECHNICAL BACKGROUND OF THE INVENTION

Combat aircraft are among the most effective and precise military tools presently available. Because of their fuel consumption requirements, such aircraft are generally configured to carry one or more external fuel tanks. Fuel is drawn from the external tanks until the aircraft reaches the target area, at which time the external tanks are jettisoned. The external fuel tanks thus extend the aircraft's effective range without hampering its maneuverability during combat.

External fuel tanks are judged by several criteria. For instance, the tanks should have an aerodynamic profile which offers minimal air resistance during flight. Moreover, the tank must be designed to offer minimal resistance regardless of the amount of fuel in the tank. Accordingly, many external tanks are prolate, i.e., cigar-shaped.

Some external tanks include a flexible sack which holds the fuel. Such a sack may be distended so that it assumes an aerodynamic profile when initially filled with fuel. However, the surface area of such a conventional sack does not decrease during flight as fuel is consumed. Portions of the sack therefore become unnecessary in that they are no longer needed to form a container with sufficient volume to carry the remaining fuel. As fuel is consumed, increasing excess areas of the sack's surface are therefore freed to flap, ripple, or otherwise distort the aircraft's aerodynamic profile.

Fuel tanks are also judged by their storage and assembly requirements. Because they are often jettisoned after one use, a large number of external fuel tanks may be needed to support a given operation. However, fuel tanks typically hold 300 to 1000 gallons, and therefore require large amounts of storage space unless they can be stored in less volume when they are empty than when they are full. Unless the tanks can be stored compactly, it may be difficult or impossible to find sufficient storage space on an aircraft carrier, for instance, or aboard ships and planes that are used to carry supplies to a distant operation.

The storage requirements of empty fuel tanks are reduced if the tanks are "nestable," that is, if the tanks fit together in a smaller space when they are empty than when they are full. One approach to making tanks nestable is to make each tank an assembly of component sections that fit together in less space than the assembled tanks. Such tanks are herein denoted "sectional" tanks. A typical sectional tank includes a nose section, a tail section, and several center sections. Sectional tanks are designed such that the separated sections nest within one another, thereby reducing the storage space needed for the component sections of empty fuel tanks.

However, the time and effort required to assemble sectional fuel tanks is a major drawback. A typical sectional fuel tank requires several hours of assembly by at least two experienced workers before the tank is ready to receive fuel. If sectional tanks are assembled too far in advance of the time they are needed, the space savings gained by storing the tanks in nested fashion are not realized. But if the sectional tanks are not fully assembled within a few minutes of the time they are needed, necessary sorties and countermeasures by aircraft that rely on external tanks may be difficult or impossible.

External fuel tanks are also judged by their ability to withstand various forces. External tanks are necessarily subjected to strong forces caused by flight maneuvering. In addition, it is not unusual for external tanks to receive forces due to ballistic impact (gunfire), physical impact (crash), or internal fuel ignition. Fuel tanks capable of withstanding such forces, or of degrading gracefully under the impact of such forces, are said to have a degree of survivability.

The survivability of a fuel tank depends to a large extent on the materials used to make the tank. Traditionally, external fuel tanks have been constructed primarily of aluminum or another metal. However, rifle bullets can catastrophically rupture a standard metal tank, essentially causing the tank to explode. Standard aluminum fuel tanks are also vulnerable to fuel fires because aluminum has a relatively low melting point, and to physical impacts because aluminum is brittle.

Composite tanks formed by fiber winding resin-impregnated filaments about a mandrel have superior survivability. Composite tanks leak rather than rupturing when hit by small arms fire. Composite tanks also survive physical impact better than metal tanks because composite tanks are less brittle and have few or no localized seams. In addition, composite tanks can be made with self-insulation, low thermal conductivity, and ablation in order to resist higher temperatures than metal fuel tanks.

Regardless of the material used, however, rigid fully assembled tanks do not readily nest and hence cannot be stored compactly. Fully assembled rigid composite tanks require at least as much storage space as assembled metal tanks of equal carrying capacity. Moreover, the assembly of sectional composite tanks requires substantially the same time and effort as the assembly of sectional metal tanks.

Thus, it would be an advancement in the art to provide a nestable assembled external fuel tank. That is, it would be an advancement to provide an empty external fuel tank which is both highly nestable and substantially ready to receive fuel.

It would also be an advancement in the art to provide such a fuel tank which has better survivability than rigid metal tanks.

It would be a further advancement to provide such a fuel tank which has an aerodynamic profile that offers minimal wind resistance during flight.

It would be an additional advancement to provide a method for forming such a nestable assembled external fuel tank.

Such a nestable assembled external fuel tank and a method for forming such tanks are disclosed and claimed herein.

BRIEF SUMMARY OF THE INVENTION

The present invention provides a nestable assembled external fuel tank for an aircraft. The fuel tank includes a rigid securement configured and disposed for securing the fuel tank to the aircraft, and a skin connected to the securement. The skin substantially defines a fuel chamber for containing aircraft fuel. In a presently preferred embodiment, a flexible liner is positioned on the inside surface of the skin and the liner defines the fuel chamber.

The skin, which is deformable between an empty position and a filled position, includes an elastic fiber and a tensile fiber embedded in a flexible matrix. Because the skin is elastic, it expands as fuel is placed in the fuel chamber. However, the skin is configured such that the tensile fiber limits the expansion of the elastic fiber and the flexible matrix after a predetermined amount of fuel is in the fuel chamber. The tensile fiber thus prevents leakage or failure that might occur if the skin were permitted to expand too far.

The tensile fiber adds structural strength that permits the tank to withstand the forces that arise when a fighter aircraft takes off, maneuvers during flight, and lands. The strength imparted by the nature of the tensile fiber also improves the survivability of the fuel tank in response to ballistic, physical impact, and ignition forces.

In contrast with conventional flexible sack tanks, the surface area of the skin of the present invention tends to decrease as the fuel carried decreases because the elastic fiber urges the skin to contract as fuel is consumed. When the fuel chamber is emptied of fuel and is not pressurized, the elastic fiber urges the skin into a compact position wherein both the volume of the fuel chamber and the outer dimensions of the fuel tank are substantially smaller than when the fuel chamber is filled. Thus, a fuel tank formed according to the teachings herein may be stored compactly even though it is fully assembled and ready to receive fuel. For instance, empty tanks may be stacked in nested fashion on a pallet in substantially less room than would be needed to store the filled tanks.

Moreover, by pressurizing the tank as fuel is consumed, contraction of the skin may be effectively limited to tank storage and other circumstances in which such contraction is advantageous. During flight the skin may be maintained in an aerodynamic and stable filled position by pressurization even though some or all of the fuel carried by the tank has been consumed.

The elastic fiber and the tensile fiber are wound in layers within the flexible matrix, with the fibers of each layer oriented to increase the strength of the overall skin. The elastic fiber and the tensile fiber may be wound as separate strands in a variety of configurations. However, in the presently preferred configuration the tensile fiber is wrapped spirally about the elastic fiber prior to winding. This spiral configuration permits simultaneous winding of both fibers and provides control over the extent of expansion of the elastic fiber.

The elastic fiber is preferably capable of stretching up to four times its unstressed length without losing sufficient elasticity to urge the fiber back to its original length once the stretching force is removed. The presently preferred elastic fiber is an elastomeric fiber such as an elastic, segmented polyurethane fiber. Other elastic fibers may also be used, such as fibers comprising natural or artificial rubber.

The tensile fiber is preferably capable of providing, in combination with the elastic fiber and the flexible matrix, sufficient structural strength for the pressurized skin to resist the forces normally caused by flight maneuvers. An inelastic tensile fiber such as an aramid polymer fiber is suitable, and an aromatic polycarbonamide fiber is presently preferred.

Although the elastic fiber and the tensile fiber bear much of the load imposed by the fuel, the flexible matrix must have sufficient strength to hold the fibers together. The flexible matrix is preferably formed of natural rubber or neoprene rubber. The tank preferably also includes a fuel-resistant liner or bladder disposed inside and bonded to the flexible matrix to define the fuel chamber.

The present invention further includes a method for forming such an assembled nestable fuel tank. Initially, a mandrel is obtained. The mandrel has an exterior configured substantially in the shape and size of the interior of the fuel tank in the fuel tank's filled position. If the tank is to include a liner rather than relying on the flexible matrix alone to retain the fuel, then the exterior of the mandrel is substantially covered with the liner.

Next, a composite layer is laid up by winding about the mandrel a plurality of layers of fibrous material embedded in a flexible matrix. The composite layer forms the skin of the fuel tank. The fibrous material includes the elastic fiber and the tensile fiber discussed above. As noted, the fibers are preferably configured with the tensile fiber wrapped spirally about the elastic fiber to permit simultaneous winding of both fibers.

The elastic fiber is preferably stressed during winding by stretching the fiber between the mandrel and the winding machine. The resulting stress is borne principally by the spirally wound tensile fiber. Thus, the composite layer forms a skin which is in the filled position, with the elastic fiber stretched and ready to urge the skin back toward its more compact empty position once the mandrel is removed and the skin is complete.

According to an alternative method of the present invention, one obtains a mandrel formed substantially of a material which has a melting point less than the vulcanization temperature of a selected flexible matrix material. The selected flexible matrix material may include natural rubber, neoprene rubber, or a combination of the two. The mandrel is formed of polystyrene, polyvinyl alcohol, plaster, or a like material.

The alternative method includes the step of heating the composite layer to a temperature sufficient both to vulcanize the flexible matrix and to melt the material forming the mandrel. When the composite layer is formed by wrapping the elastic fiber under tension as described above, caution must be used in removing the mandrel to prevent damage to the elastic fiber. However, melting the mandrel facilitates separation of the vulcanized skin from the mandrel by allowing the elastic fiber to contract. Melting is accomplished by heating the mandrel or by exposing it to an appropriate solvent. After the skin contracts, the melted mandrel material is easily removed from within the vulcanized composite layer.

In summary, the present invention provides a fuel tank which is both substantially ready to receive fuel and nestable for compact storage when empty. Moreover, the fuel tank has good survivability because it is formed of an elasticized composite rather than brittle metal joined at seams. The skin has an aerodynamic prolate profile when filled, and also maintains a low-resistance aerodynamic profile while it empties.

These and other features and advantages of the present invention will become more fully apparent through the following description and appended claims taken in conjunction with the accompanying drawings.

BRIEF DESCRIPTION OF THE DRAWINGS

In order that the manner in which the above-recited and other advantages and features of the invention are obtained, a more particular description of the invention summarized above will be rendered by reference to the appended drawings. Understanding that these drawings only provide a selected embodiment of the invention and are not therefore

DETAILED DESCRIPTION OF THE PREFERRED EMBODIMENTS

Reference is now made to the figures wherein like parts are referred to by like numerals. The present invention relates to a nestable assembled external fuel tank for an aircraft. External fuel tanks are typically utilized by a combat aircraft to extend the aircraft's effective range without hampering its maneuverability during combat. After being filled with fuel, the tanks are secured beneath the aircraft's wings. During flight, fuel is drawn from the external tanks as the aircraft travels toward the target area. When the target area is reached, or when hostile aircraft are encountered, the external tanks are commonly jettisoned in order to improve the aircraft's maneuverability.

Figure 1:
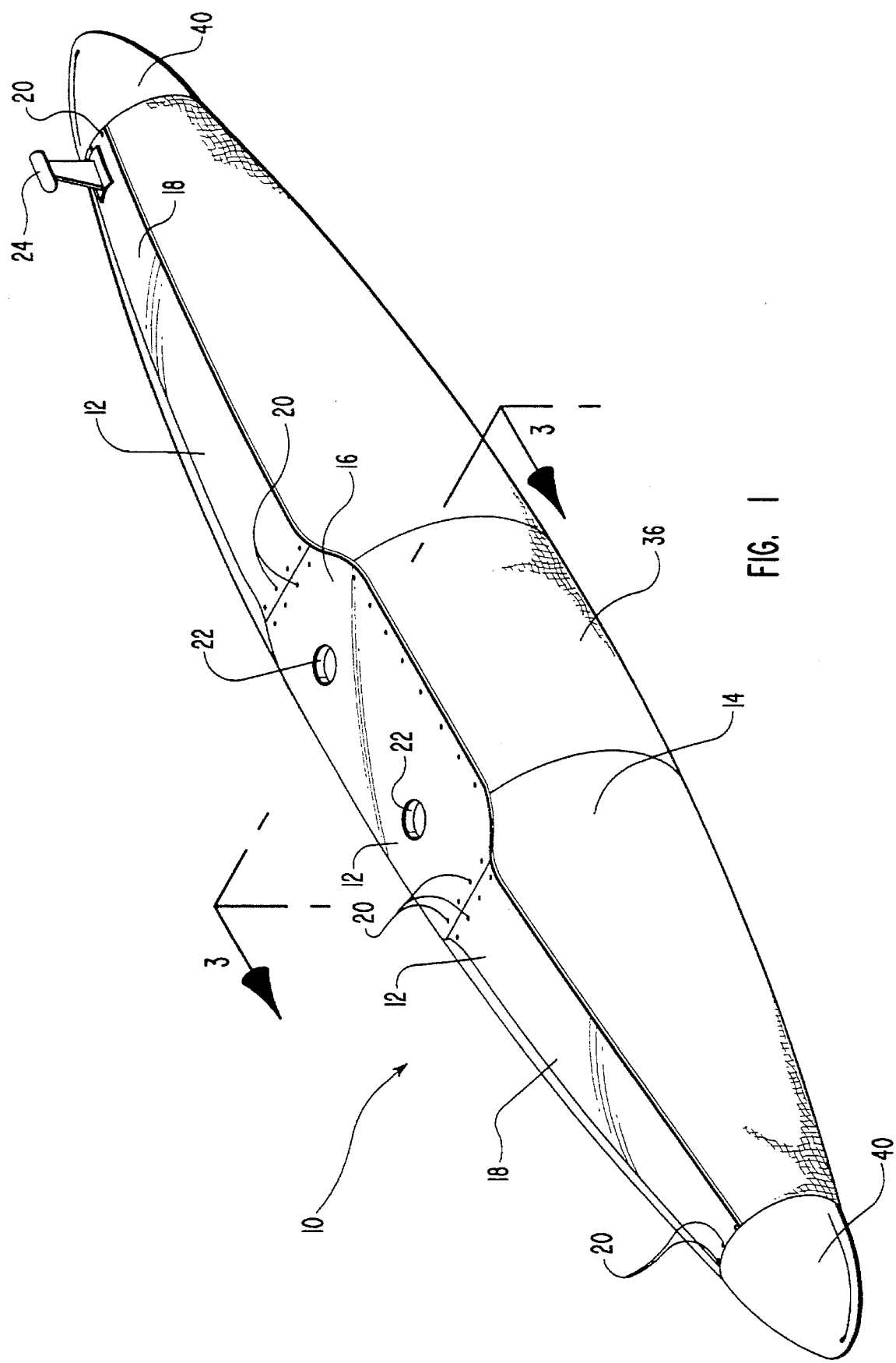
FIG. 1 is a perspective view of a fuel tank of the present invention in the tank's filled position.

One embodiment of such a fuel tank is designated generally at 10 in FIG. 1. The fuel tank 10 includes a rigid securement 12 which is configured and disposed for securing the fuel tank 10 to the aircraft (not shown). The fuel tank 10 further includes a skin 14 which is connected to the securement 12 and which holds the aircraft fuel in readiness for use by the aircraft.

The securement 12 preferably covers about the top one-fourth of the tank 10 and substantially spans the length of the tank 10. The presently preferred securement 12 comprises a hardback 16 secured to two springbacks 18 by bolts 20. In an alternative embodiment, the hardback 16 and the springbacks 18 are formed integrally in a single continuous piece.

The hardback 16 is configured with one or more openings 22. The openings 22 are configured with conventional fittings, valves, piping, and the like to permit and control fluid communication between a source of fuel (not shown) and the interior of the tank 10 while the tank 10 is filled with fuel. The openings 22 and associated conventional plumbing are further configured to permit the aircraft to draw fuel out of the tank 10 as needed during flight. The openings 22 and associated conventional plumbing are also preferably configured to pressurize the tank 10 as fuel is withdrawn, in order to maintain the tank 10 in an aerodynamic and stable configuration.

The hardback 16 is formed of a rigid material which has sufficient structural strength to secure the tank 10 to the aircraft during flight. It is presently preferred that the hardback 16 comprise a carbon fiber laminate or a similar composite material. Other materials suitable for use in the hardback 16 include steel, aluminum alloys, and materials conventionally used for structural parts in the aeronautic and aerospace industries.

The springbacks 18 are formed of a rigid material which has sufficient structural strength to support the underlying portions of the tank 10 during flight. The springbacks 18 are preferably formed of a material which flexes away from the wing in response to loads imposed by the fuel mass and which also tends to resume a flatter position as fuel is consumed. That is, the springbacks 18 preferably draw the skin 14 toward the aircraft wing as fuel is consumed, thereby improving the aerodynamic profile of the tank 10 during flight. Suitable materials for use in the springbacks 18 include glass epoxy materials, carbon epoxy materials, steel, and similar alloys and materials known in the aerospace and aeronautic arts.

The fuel tank 10 may be secured to the aircraft by conventional means, such as by a combination of lugs, pylons, and sway braces (not shown). Thus, the securement 12 assists in securing the skin 14 to the aircraft until the tank 10 is jettisoned. A pivot bracket 24 is secured to one of the springbacks 18 for controlled ejection of the tank 10 as the tank 10 is jettisoned.

Figure 3:
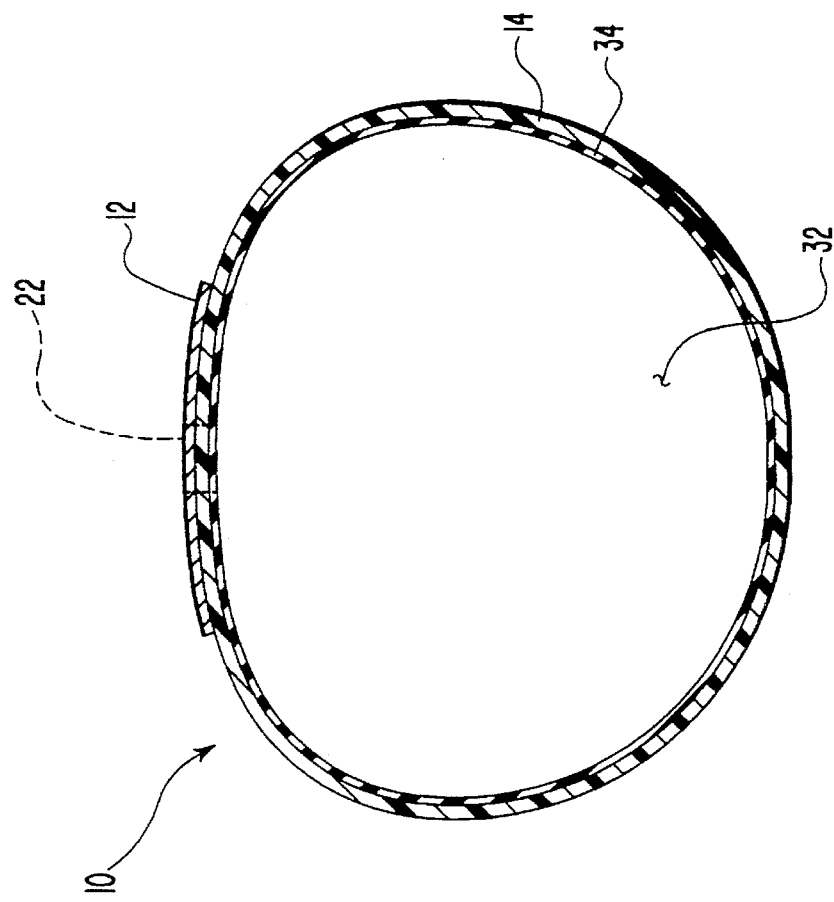
FIG. 3 is a cross-sectional view taken along line 3—3 of FIG. 1, further illustrating the flexible matrix, liner, and securement of the fuel tank.

As illustrated best in FIG. 3, the skin 14 substantially defines a fuel chamber 32. The aircraft fuel that is drawn from the tank 10 during flight resides within the fuel chamber 32 prior to use. In the presently preferred embodiment, a flexible liner 34 is positioned on the inside surface of the skin 14 and bonded to the skin 14 to substantially define the fuel chamber 32. The liner 34 acts as a fuel bladder to retain the fuel inside the fuel chamber 32 until the fuel is drawn out for use in propelling the aircraft. The liner 34 therefore comprises a material selected for its ability to resist corrosion by aircraft fuel. In addition, the liner 34 preferably comprises a material capable of high elongation, that is, of elongation of about 400 percent. Suitable liner materials include butyl rubber, neoprene rubber, polyurethane, the flexible resin sold under the mark VITHANE® by Loral Corporation of New York, New York, and like materials.

Figure 2:
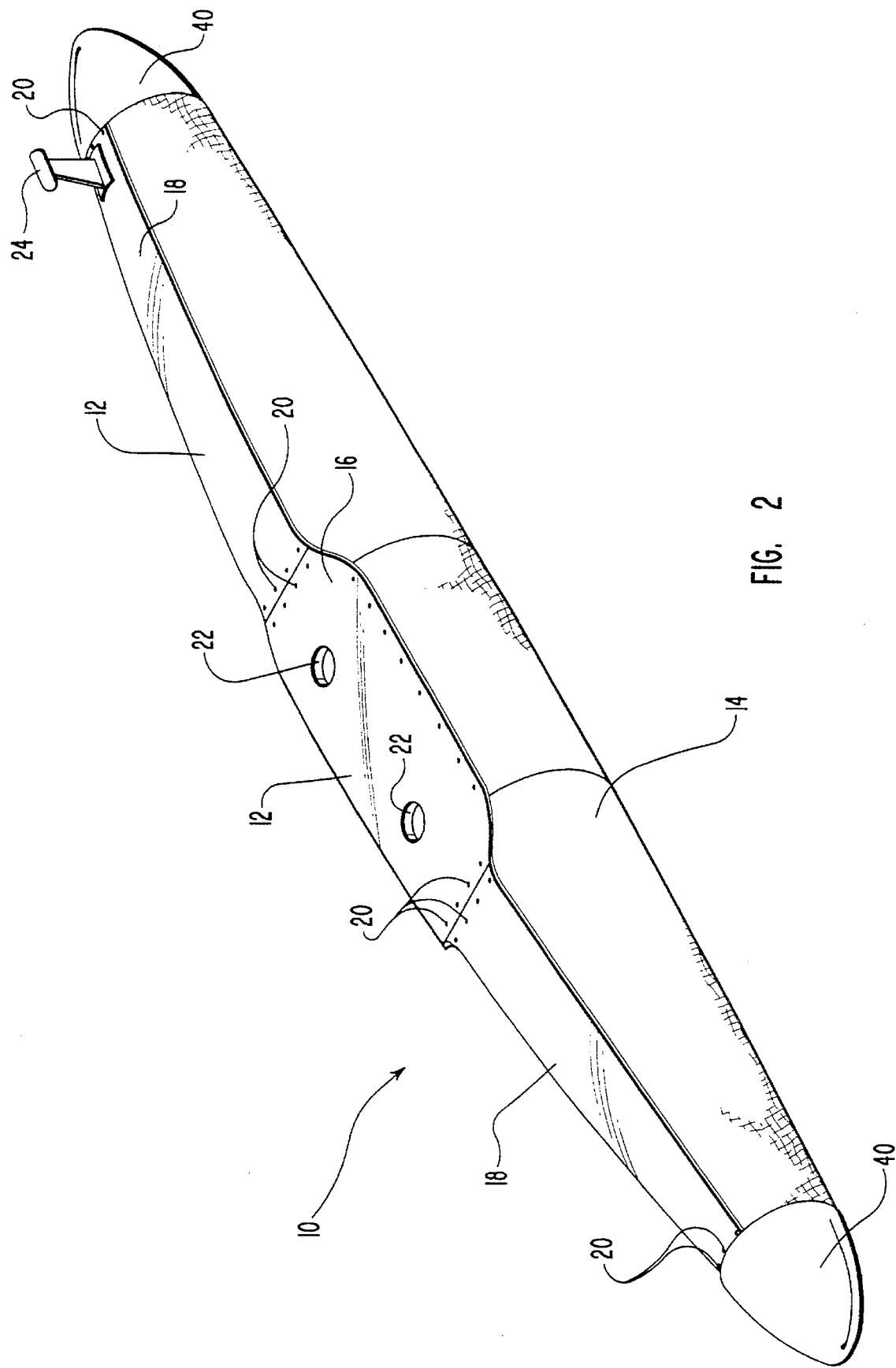
FIG. 2 is a perspective view of the fuel tank of FIG. 1, illustrating the tank in its empty position.

The skin 14 and the securement 12 are connected by adhesive, mechanical, or other methods known in the art. In the presently preferred embodiment illustrated in FIGS. 1 and 2, the skin 14 is connected to the securement in part by a belt 36 which is bolted to the securement 12 by bolts 20 and which surrounds a center portion of the skin 14 beneath the hardback 16. In addition to connecting the skin 14 to the securement 12, the belt 36 provides additional structural strength about that portion of the fuel chamber 32 (FIG. 3) which typically has the largest cross sectional area when the fuel tank 10 is filled. The belt 36 is preferably formed of the same materials as the skin 14. The belt 36, the hardback 16, and connections between the skin 14 and the springbacks 18 provide load-bearing securement of the skin 14 to the aircraft.

Figure 4:
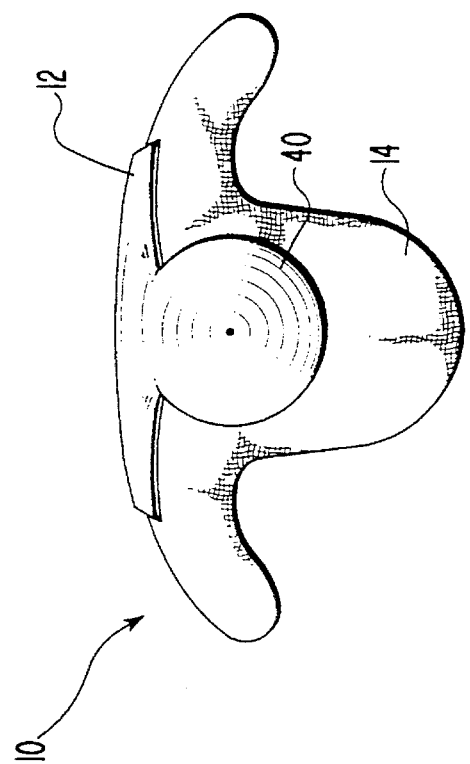
FIG. 4 is an end view of the fuel tank when the tank is empty and depressurized showing the securement, one rigid end cap, and the skin of the fuel tank.

The skin 14 is deformable between a filled position as shown in FIG. 3, and an empty position as shown in FIG. 4. Deformation is possible because the skin 14 is formed of composite materials which include a pretensioned elastic fiber and a tensile fiber embedded in a flexible matrix. When the tank 10 is in the filled position the elastic fiber is lengthened in response to the fuel placed in the fuel chamber 32 and/or the tank pressurization, and the tensile fiber resists further lengthening of the elastic fiber. Thus, the maximum amount of fuel the tank 10 can hold is predetermined. When the tank 10 is in the empty position the elastic fiber is contracted. This contraction substantially reduces the volume of the fuel chamber 32 and of the tank 10 in comparison to the filled position.

Expansion of the skin 14 as fuel is placed in the fuel chamber 32 is accomplished through the combined elasticity of the elastic fiber and the flexible matrix. The elastic fiber is preferably capable of stretching up to about four times its unstressed length without losing sufficient elasticity to urge the fiber back to substantially its original length once the stretching force is removed. The presently preferred elastic fiber is an elastic, segmented polyurethane fiber such as the synthetic fiber sold under the mark LYCRA® by E. I. Du Pont de Nemours and Co. Other elastomeric fibers or elastic fibers may also be used, such as spandex fibers, vyrene fibers, elastomeric rubber fibers, polyurethane fibers, and like materials.

The tensile fiber is preferably capable of providing, in combination with the elastic fiber, the flexible matrix, and the tank pressurization, sufficient structural strength for the skin 14 to resist forces normally caused by flight maneuvers. The presently preferred tensile fiber is a fiber such as the aramid fiber sold under the mark KEVLAR® by E. I. Du Pont de Nemours and Co. Other suitable fibers include aromatic polycarbonamide fibers, carbon fibers, glass fibers, graphite fibers, and other fibers typically used for reinforcing composite structures formed by fiber or filament winding methods. Although the presently preferred tensile fiber is inelastic, a tensile fiber having a degree of elasticity may be suitable if it provides sufficient structural strength and limits expansion of the skin 14 to prevent fuel leakage.

It is presently preferred that the elastic fiber and the tensile fiber bear much of the load imposed by the fuel, but the flexible matrix must have sufficient strength and cohesion to hold the fibers together in a suitable configuration. The flexible matrix is preferably formed of natural rubber or neoprene rubber. The flexible matrix preferably has a degree of elasticity compatible with the effective elasticity of the elastic fiber. In an alternative embodiment, the flexible matrix is fuel-resistant and no separate liner 34 is employed.

The elastic fiber and the tensile fiber are wound in layers within the flexible matrix with the fibers in each layer oriented to increase the overall strength of the skin 14. Suitable fiber configurations are accomplished through hoop winding, helical winding, and other fiber orientation methods known in the fiber and filament winding art. A combination of hoop and helical winding is presently preferred. Suitable fiber configurations permit the tensile fiber to limit the expansion of the elastic fiber to prevent leakage while also permitting the elastic fiber to urge the empty tank 10 toward a compact position.

The elastic fiber and the tensile fiber may be wound as separate strands in a variety of configurations. For example, in one embodiment the strands are laid up with the elastic and tensile fibers substantially parallel to one another. In three other embodiments the elastic fibers and tensile fibers are wound in alternating layers, are interleaved, and are interwoven with each other, respectively.

However, in the presently preferred configuration the tensile fiber is wrapped spirally about the elastic fiber prior to winding. The presently preferred spiral configuration is a LYCRA®- KEVLAR® spiral fiber combination available from E. I. Du Pont de Nemours and Co. The spiral configuration permits simultaneous winding of both fibers, thereby eliminating problems caused by trying to coordinate separate elastic and tensile fiber strands during winding.

The spiral configuration also provides control over the extent of expansion of the elastic fiber. Control is achieved by altering the distance between successive loops of the tensile fiber spiral. Examination of the behavior of the spiral combination reveals a close relationship between the spacing of spiral loops and the effective elasticity of the elastic fiber. With reference to FIG. 3, as fuel is added to the fuel chamber 32 the resulting increased load on the skin 14 is initially absorbed principally by the elastic fiber and the flexible matrix. The elastic fiber and the flexible matrix each absorb a share of the load by stretching. During this initial stage the tensile fiber spiral also expands because the distance between successive loops in the spiral increases. But the tensile fiber is not the principal load-bearing fiber at this time.

As more fuel or increased pressure is added and the load increases, however, the tensile fiber spiral stops stretching and the tensile fiber becomes the primary load-bearing fiber. Altering the distance between loops of the spiral alters the length of tensile fiber per unit length of elastic fiber, thereby altering the maximum length of the stretched tensile fiber spiral. Controlling the maximum extent of the stretched spiral in turn controls the extent to which the elastic fiber can expand before the tensile fiber takes over as the principal load-bearing fiber.

The elastic fiber and the tensile fiber are accordingly configured such that the tensile fiber limits expansion of the skin 14 after a predetermined amount of fuel and/or pressure is placed in the fuel chamber 32. By preventing further expansion the tensile fiber places an upper limit on the volume of the fuel chamber 32, and thereby defines the fuel capacity of the fuel tank 10.

If the flexible matrix were permitted to expand excessively, the flexible matrix could tear or rupture. The resulting fuel leakage could be catastrophic. Likewise, if the elastic fiber were permitted to expand beyond a certain limit, the tank 10 could leak. Thus, the upper limit on expansion imposed by the tensile fiber is chosen to prevent the elastic fiber and the flexible matrix from reaching their respective breaking points. Those of skill in the art can readily determine safe limits for the expansion of the flexible matrix and the elastic fiber in view of the teachings herein.

In addition to limiting expansion of the skin 14 to prevent leakage, the tensile fiber adds structural strength to the skin 14. The tensile fiber in combination with the elastic fiber and the flexible matrix provide the tank 10 with sufficient structural strength to withstand the forces that arise when a fighter aircraft takes off, maneuvers during flight, and lands. The strength imparted by the tensile fiber also improves the survivability of the fuel tank in response to ballistic, physical impact, and ignition forces. The nature and extent of these forces are well known to those of skill in the art, as are methods for predicting and testing the reaction of devices to such stresses.

As noted earlier, conventional tanks with a flexible skin sack maintain a constant skin surface area regardless of the amount of fuel inside the skin. By contrast, the surface area of the skin 14 of the present invention tends to decrease as the fuel carried within the skin 14 decreases. This decrease in surface area is accomplished by the elasticity of the elastic fiber and the elasticity of the flexible matrix. In the absence of tank pressurization, such elasticity urges the skin 14 to contract as fuel is consumed. When the tank 10 is emptied and depressurized, the elastic fiber and the flexible matrix urge the skin 14 into a compact position such as that shown in FIG. 4. In this empty position both the volume of the fuel chamber 32 (FIG. 3) and the outer dimensions of the fuel tank 10 are substantially smaller than when the fuel chamber 32 is filled.

Figure 5:
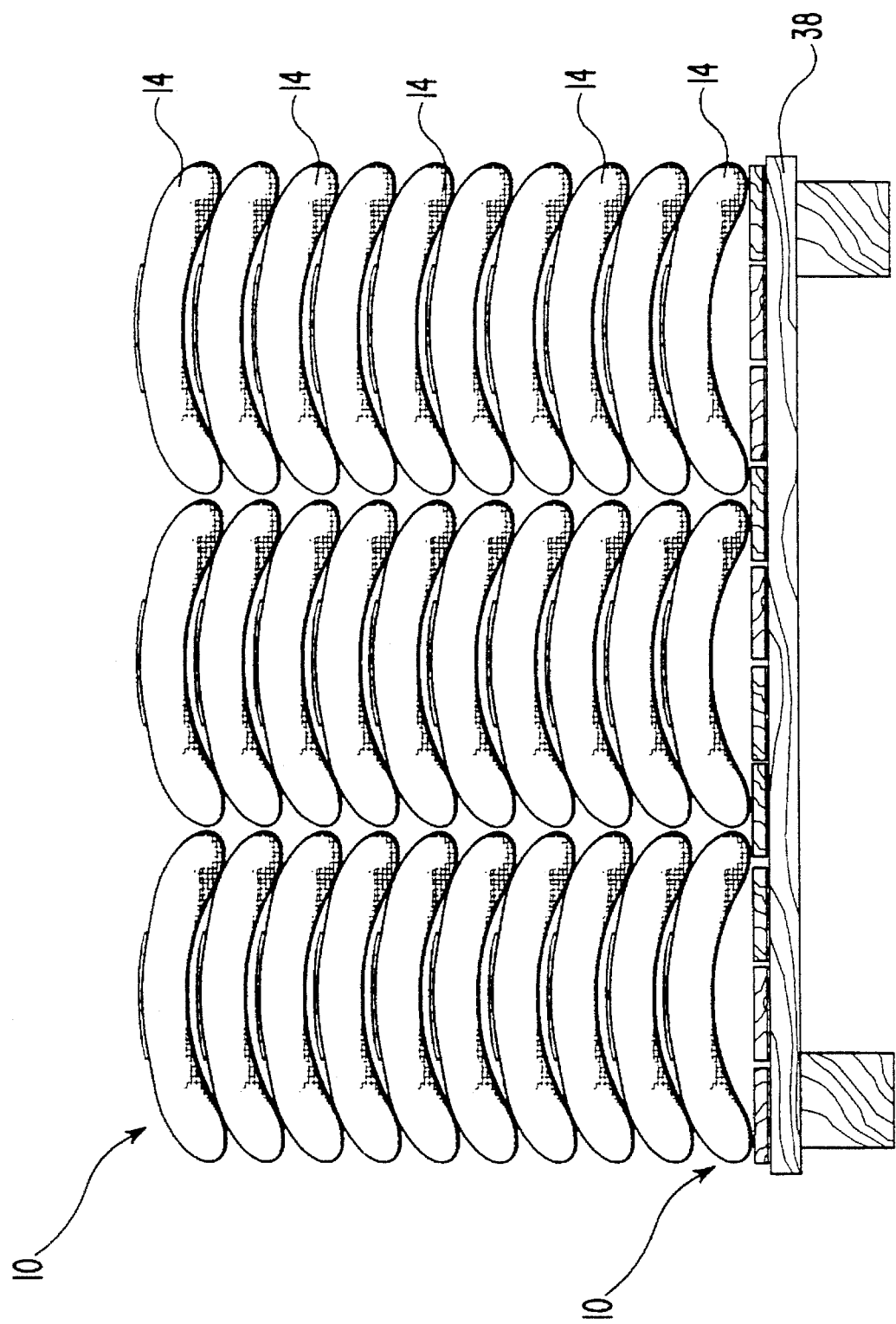
FIG. 5 is a plan view illustrating a plurality of empty fuel tanks stacked for compact shipping or storage.

In a similar fashion, the elastic fiber and the flexible matrix help compress a fuel tank 10 which has not yet been filled with fuel. Thus, a fuel tank 10 formed according to the teachings herein may be stored compactly even though it is fully assembled and ready to receive fuel. For instance, empty fuel tanks 10 may be stacked in "nested" fashion on a pallet 38 as illustrated in FIG. 5. The fuel tanks 10 are "nested" when they require substantially less room to store empty of fuel than would be needed to store them if they were filled with fuel.

Moreover, tanks 10 formed according to the present invention avoid the severe problems caused when excess sack areas flap or ripple because the skin 14 of the present tank contracts as fuel is used during flight. To further assist in maintaining the tank 10 in an aerodynamic and stable configuration as fuel is withdrawn during flight, it is presently preferred to pressurize the tank 10. To avoid flutter, the tank 10 remains pressurized throughout the flight regime with an internal pressure in the range from about 25 to about 40 p.s.i.

As illustrated in FIGS. 1 and 4, one or two rigid end caps 40 may be secured to one or both ends of the skin 14 to further improve the aerodynamic properties of the fuel tank 10. The end caps 40 are formed of composite, metallic, or other known materials used in conventional wings, fuselages, and similar structures.

In short, the tank 10 is nestable when empty, as illustrated in FIG. 5. Nonetheless, the empty skin 14 is substantially ready to receive fuel. To fill the fuel tank 10, one merely removes the tank 10 from the pallet 38, attaches appropriate pump fixtures to the openings 22 (FIG. 1), and pumps fuel from a conventional fuel source through the openings 22 into the fuel chamber 32 (FIG. 3). In contrast with sectional fuel tanks, no significant assembly is required to prepare nested tanks according to the present invention before they can be filled with fuel.

Figure 6:
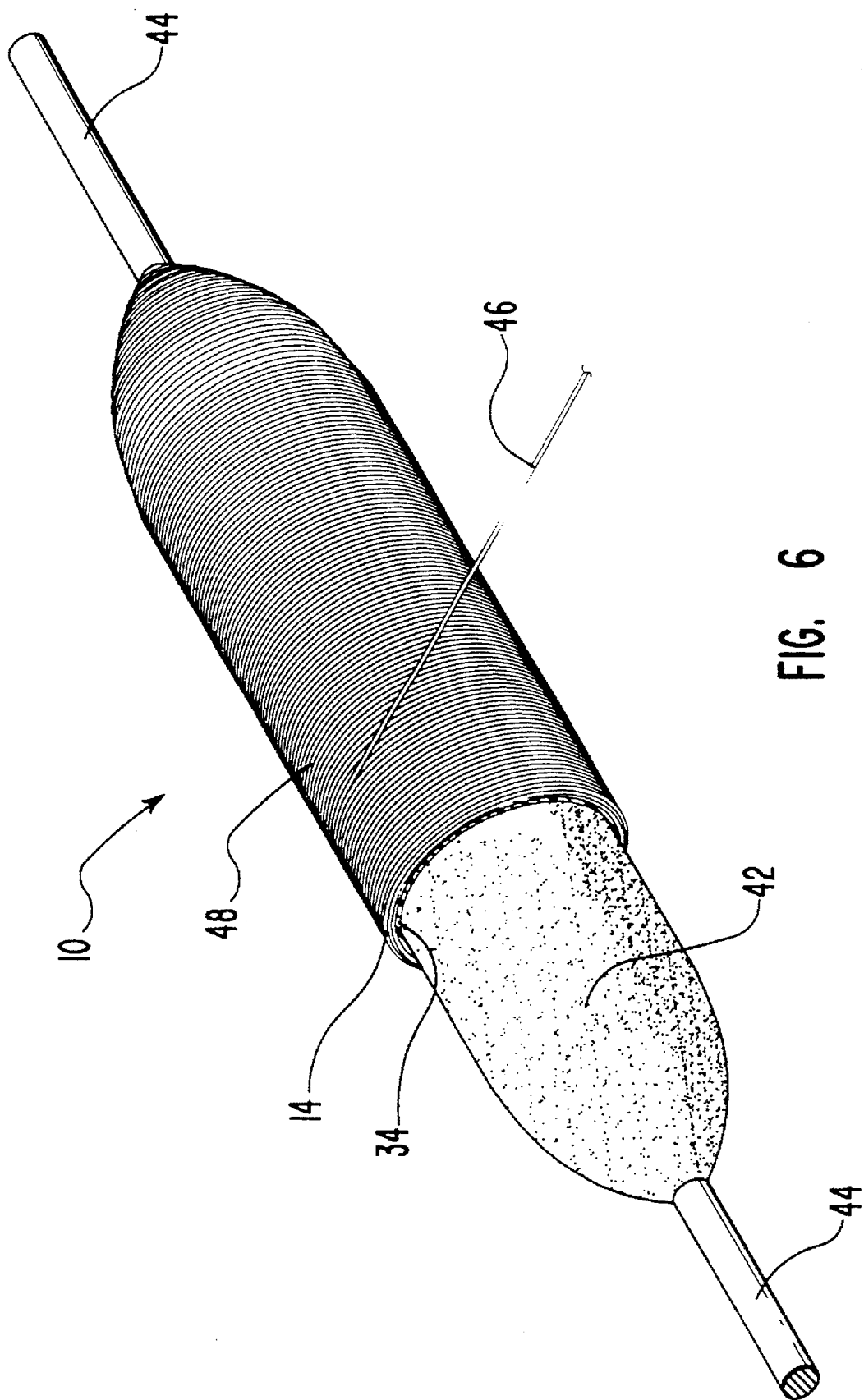
FIG. 6 is a partial cut away perspective view illustrating a fuel tank being formed about a mandrel according to the method of the present invention.

The present invention also includes a method for forming such a nestable assembled fuel tank 10. As illustrated in FIG. 6, a mandrel 42 is obtained. The mandrel 42 has an exterior configured in substantially the shape and size of the fuel chamber 32 (FIG. 3) of the fuel tank 10 being formed. For reasons that will become apparent momentarily, the mandrel 42 preferably has the shape and size of the fuel chamber 32 in the tank's filled position. The mandrel 42 is preferably mounted for ease of manipulation on a shaft 44.

When forming an embodiment of the tank 10 which includes a liner layer 34, the exterior of the mandrel 42 is substantially covered with the liner layer 34. The liner 34 is configured as a tube which is slid over the mandrel 42. In an alternative embodiment, no liner 34 is employed.

A composite skin layer 14 is then wound about the liner 34 if one is present, or directly about the mandrel 42 if no liner 34 is employed. The composite skin 14 is formed by winding about the mandrel 42 a plurality of layers of fibrous material 46 embedded in a flexible matrix 48. The fibrous material 46 includes an elastic fiber and a tensile fiber selected and configured as taught herein.

The fibrous material 46 is preferably wound under tension in a manner that provides within the completed skin 14 an elastic fiber which urges the skin 14 to contract, thereby gaining the advantages of nesting for compact storage. The degree of tension varies according to the relation of the size of the mandrel 42 in comparison to the final size of the fuel chamber 32 (FIG. 3). For example, when the mandrel 42 has substantially the shape and size of the fuel chamber 32 in the tank's filled position and the fibrous material 46 is configured in the preferred spiral configuration taught herein, the fibrous material 46 is preferably wound under tension that is sufficient to make the tensile fiber spiral the principal load-bearing fiber during winding. That is, a tank in the filled position is created having a skin 14 that will compact the tank 10 after the mandrel 42 is removed.

Some tension is necessarily applied during winding. However, those of skill in the art will appreciate that a nestable tank 10 may also be obtained by winding the elastic fiber under less tension about a mandrel 42 which conforms more closely to the size and shape of the empty fuel chamber. That is, a tank near the empty position is created having a skin 14 that is already substantially compacted because the tension on the elastic fiber during winding is less than the tension applied when winding a "filled" tank.

According to an alternative method of the present invention, one obtains a mandrel 42 formed substantially of a material which has a melting point less than the vulcanization temperature of a selected flexible matrix material. The selected flexible matrix material may include natural rubber, neoprene rubber, or a combination of the two. The mandrel 42 is preferably formed of a material which is sufficiently rigid under winding conditions to support fiber winding, but which is deformable for removal after winding. Suitable materials include polystyrene, water-soluble plaster, sand and water-soluble polyvinyl alcohol mixtures, and eutectic salts.

The alternative method includes the step of heating the composite layer 14 to a temperature sufficient both to vulcanize the flexible matrix and to melt the material forming the mandrel 42. The mandrel 42 may also be effectively melted for removal by exposing it to a suitable solvent. When the composite layer 14 is formed by wrapping the elastic fiber under tension as described above, caution must be used in removing the mandrel 42. If care is not taken, the tank 10 may be damaged during removal of the skin 14 because the skin 14 is urged against the mandrel 42 by the elastic fiber and the flexible matrix.

However, melting the mandrel 42 facilitates separation of the vulcanized skin 14 from the mandrel 42 by allowing the elastic fiber to contract. After the skin 14 contracts, the melted mandrel material is easily removed from within the vulcanized composite layer 14 by pouring, extraction with a tool, or other conventional methods.

Embodiments having a single elastic fiber and a single tensile fiber are described at length herein. However, it will be appreciated by those of skill in the art that fuel tanks according to the present invention, as well methods for forming such tanks, may also employ a plurality of elastic fibers, a plurality of tensile fibers, or a plurality of each type of fiber. For example, elastic fibers having different elasticities may be combined in a single fuel tank, as may tensile fibers having different tensile strengths, or tensile fibers with varying degrees of elasticity.

In summary, the fuel tank of the present invention is a nestable assembled fuel tank. Empty fuel tanks are nestable in that they may be stored and shipped in substantially less space than is required for the same tanks when filled. In addition, the empty tanks are substantially ready to receive fuel. Unlike sectional tanks, no significant assembly is required before the empty tanks can be used.

Moreover, the fuel tank of the present invention has good survivability with regard to physical impacts from crashes, ballistic impact from bullets and other projectiles, and with regard to internal fuel ignition forces. Improved survivability is accomplished by forming the tank of elasticized composite material rather than brittle metal joined at vulnerable seams. The skin of the present fuel tank also has an aerodynamic prolate profile when filled, and the tank maintains a low-resistance aerodynamic profile while it empties.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A fuel tank for an aircraft, said fuel tank comprising:
   a rigid securement configured and disposed for securing said fuel tank to the aircraft; and
   a skin connected to said securement, said skin and said securement substantially defining a fuel chamber for containing fuel, said skin comprising an elastic fiber and a tensile fiber embedded in a flexible matrix, said skin deformable between a filled position and an empty position, such that when in said filled position said elastic fiber is lengthened in response to the placement of fuel in said chamber and said tensile fiber resists further lengthening of said elastic fiber, and when in said empty position said elastic fiber is contracted thereby substantially reducing the volume of said chamber relative to said filled position.

2. The fuel tank of claim 1, wherein said elastic fiber and said tensile fiber are wound in layers within said flexible matrix.

3. The fuel tank of claim 1, wherein said tensile fiber is wrapped spirally about said elastic fiber.

4. The fuel tank of claim 1, wherein said elastic fiber comprises an elastomeric fiber.

5. The fuel tank of claim 4, wherein said elastomeric fiber comprises an elastic, segmented polyurethane fiber.

6. The fuel tank of claim 1, wherein said tensile fiber comprises an aramid polymer fiber.

7. The fuel tank of claim 6, wherein said aramid polymer fiber comprises an aromatic polycarbonamide fiber.

8. The fuel tank of claim 1, wherein said flexible matrix comprises natural rubber.

9. The fuel tank of claim 1, wherein said flexible matrix comprises neoprene rubber.

10. The fuel tank of claim 1, further comprising a flexible liner disposed within said skin, said fuel chamber being substantially defined by the interior of said liner.

11. The fuel tank of claim 1, wherein said skin is substantially prolate when in said filled position.

12. The fuel tank of claim 11, further comprising at least one rigid end cap secured to at least one end of said substantially prolate skin for improving the aerodynamic properties of said fuel tank.

13. A fuel tank for an aircraft, said fuel tank comprising:
    a rigid securement configured and disposed for securing said fuel tank to the aircraft; and
    a skin connected to said securement, said skin and said securement substantially defining a fuel chamber for containing fuel, said skin comprising an elastomeric fiber and a tensile fiber wound in layers within a flexible matrix, said skin deformable between a substantially prolate filled position and an empty position, such that when in said filled position said elastomeric fiber is lengthened in response to the placement of fuel in said chamber and said tensile fiber resists further lengthening of said elastomeric fiber, and when in said empty position said elastomeric fiber is contracted thereby substantially reducing the volume of said chamber relative to said filled position.

14. The fuel tank of claim 13, wherein said tensile fiber is wrapped spirally about said elastomeric fiber.

15. The fuel tank of claim 13, wherein said elastomeric fiber comprises an elastic, segmented polyurethane fiber.

16. The fuel tank of claim 13, wherein said tensile fiber comprises an aramid polymer fiber.

17. The fuel tank of claim 16, wherein said aramid polymer fiber comprises an aromatic polycarbonamide fiber.

18. The fuel tank of claim 13, wherein said flexible matrix comprises natural rubber.

19. The fuel tank of claim 13, wherein said flexible matrix comprises neoprene rubber.

20. The fuel tank of claim 13, further comprising a flexible liner disposed within said skin, said fuel chamber being defined within said liner.

21. The fuel tank of claim 13, further comprising at least one rigid end cap secured to at least one end of said skin for improving the aerodynamic properties of said fuel tank.

* * * * *